(12) United States Patent
Liu

(10) Patent No.: US 11,706,623 B2
(45) Date of Patent: Jul. 18, 2023

(54) COMMUNICATION METHOD IN VEHICLE TO EVERYTHING, USER EQUIPMENT, AND NETWORK DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/114,110

(22) Filed: Dec. 7, 2020

(65) Prior Publication Data

US 2021/0092606 A1 Mar. 25, 2021

Related U.S. Application Data

(63) Continuation of application No. PCT/CN2019/092107, filed on Jun. 20, 2019.

(30) Foreign Application Priority Data

Jul. 26, 2018 (CN) .......................... 201810832687.3

(51) Int. Cl.
*H04W 12/08* (2021.01)
*H04W 4/40* (2018.01)
*H04W 12/37* (2021.01)
*H04W 8/02* (2009.01)

(52) U.S. Cl.
CPC ............ *H04W 12/08* (2013.01); *H04W 4/40* (2018.02); *H04W 8/02* (2013.01); *H04W 12/37* (2021.01)

(58) Field of Classification Search
CPC ....... H04W 76/14; H04W 4/40; H04W 76/23; H04W 4/44; H04W 88/04; H04W 76/15; H04W 72/048
See application file for complete search history.

(56) References Cited

U.S. PATENT DOCUMENTS

| 2018/0007621 A1 | 1/2018 | Kim et al. | |
| 2019/0037448 A1* | 1/2019 | Shan | H04W 60/04 |
| 2019/0150082 A1* | 5/2019 | Kedalagudde | H04W 4/46 370/329 |

(Continued)

FOREIGN PATENT DOCUMENTS

| CN | 106658352 A | 5/2017 |
| CN | 108464047 A | 8/2018 |

(Continued)

OTHER PUBLICATIONS

International Search Report dated Sep. 12, 2019 of PCT/CN2019/092107 (4 pages).

(Continued)

*Primary Examiner* — Dung Hong
(74) *Attorney, Agent, or Firm* — Perkins Coie LLP

(57) ABSTRACT

A communication method in a vehicle to everything (V2X), user equipment (UE), and a network device can achieve a correct communication between UE and UE on a PC5 interface. The method includes: receiving, by the UE, first information transmitted by the network device, the first information being configured to instruct a radio access technology (RAT) authorized to be used by the UE on the PC5 interface.

11 Claims, 4 Drawing Sheets

(56) References Cited

U.S. PATENT DOCUMENTS

2019/0313222 A1\* 10/2019 Karampatsis ......... H04W 36/22
2021/0136671 A1\* 5/2021 Kim ..................... H04W 48/18

FOREIGN PATENT DOCUMENTS

| KR | 20180021841 A | 3/2018 |
|----|---------------|--------|
| KR | 20180080070 A | 7/2018 |
| RU | 2599953 C2 | 10/2016 |
| WO | 2017076032 A1 | 5/2017 |
| WO | 2017119247 A1 | 7/2017 |
| WO | 2017149510 A1 | 9/2017 |
| WO | 2018022225 A1 | 2/2018 |
| WO | 2018066876 A1 | 4/2018 |

OTHER PUBLICATIONS

Samsung. "S2-185851, Solution for KI#2:PC5 RAT Selection for a V2X Application" SA WG2 Meeting 127bis, Jun. 2, 2018 (Jun. 2, 2018) (2 pages).
3GPP TR 23.786 V0.7.0 (Jul. 2018) (Technical Report)—3rd Generation Partnership Project Technical Specification Group Services and System Aspects; Study on architecture enhancements for EPS and 5G System to support advanced V2X services (Release 16) (57 pages).
CATT "Key Issue: RAT selection for a V2X application" S2-174938; SAWG2 Meeting #122, Jun. 2017. 2 pages.
CNIPA, First Office Action for Chinese Patent Application No. 202010683334.9. dated Jun. 1, 2021. 15 pages with English translation.
EPO, Extended European Search Report for European Patent Application No. 19841523.4. dated Jun. 23, 2021.
Huawei et al. "On UEs with limited Rx capability in PC5 CA" R2-1710086. 3GPP TSG-RAN WG2 Meeting #99bis. 4 pages.
Rospatent, Office Action for Russian Patent Application No. 2020142399. dated Jun. 28, 2021. 12 pages with English translation.
Decision on grant of patent for Russian Application No. 2020142399 dated Oct. 14, 2021. 19 pages with English translation.
Examination Report for Indian Application No. 202027057074 dated Jan. 3, 2022. 5 pages with English translation.
Notification of Reason for Refusal for Korean Application No. 10-2020-7036570 dated Nov. 23, 2021. 10 pages with English translation.
Third Office Action for Chinese Application No. 202010683334.9 dated Nov. 5, 2021. 17 pages with English translation.
Examination Report for European Application No. 19841523.4 dated Mar. 2, 2022. 6 pages.
Notice of Reasons for Refusal for Japanese Application No. 2020-571460 dated Jan. 18, 2022. 6 pages with English translation.
Final Rejection of the Korean application No. 10-2020-7036570, dated May 12, 2022. 8 pages with English Translation.
Second Office Action of the Japanese application No. 2020-571460, dated Jun. 24, 2022. 6 pages with English Translation.
Notice of Allowance for Korean Application No. 10-2020-7036570 dated Aug. 30, 2022. 4 pages with English translation.
Written Opinion for Singapore Application No. 11202012239X dated Sep. 28, 2022. 7 pages.
CNIPA, Second Office Action for Chinese Application No. 202010683334.9. dated Aug. 16, 2021. 16 pages with English translation.
IP Australia, Examination Report No. 1 for Australian Application No. 2019310543. dated Jul. 14, 2021. 4 pages.

\* cited by examiner

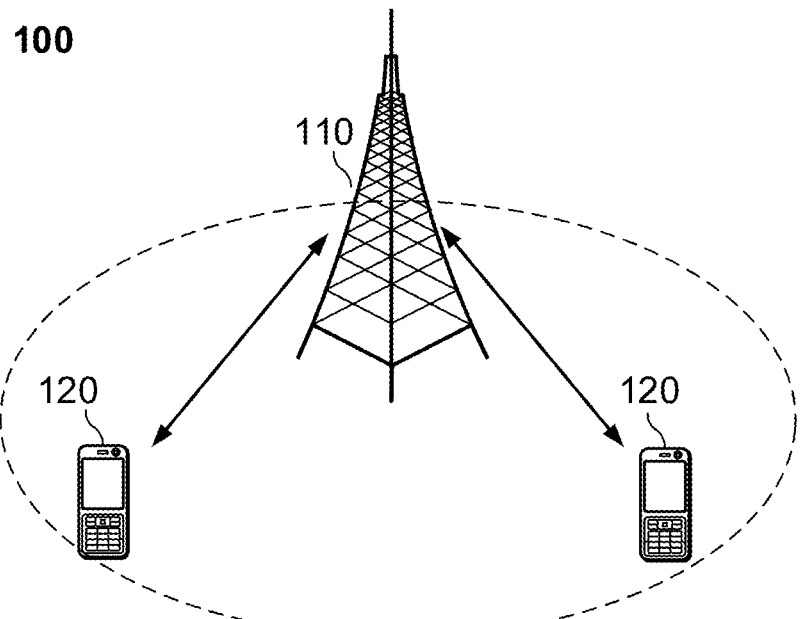
FIG. 1A
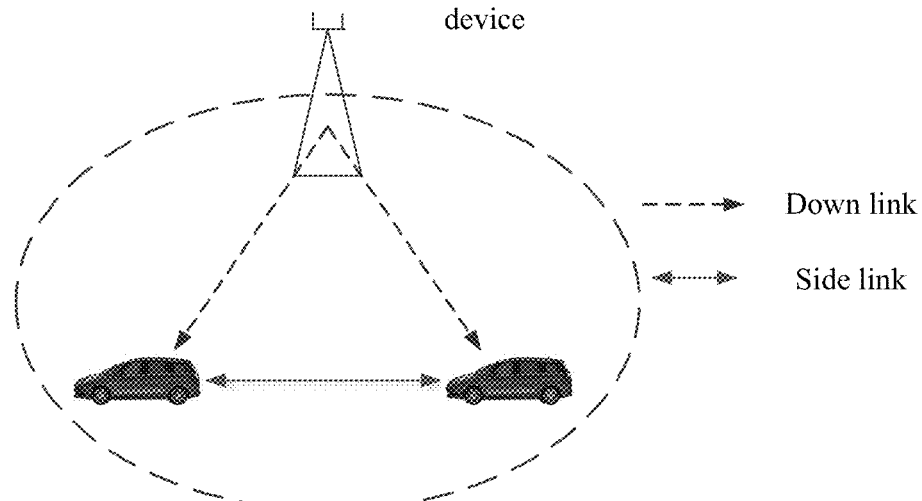
FIG. 1B
210
User equipment (UE) receives first information transmitted by a network device, the first information being configured to instruct a radio access technology (RAT) authorized to be used by the UE on a PC5 interface
FIG. 2A 300
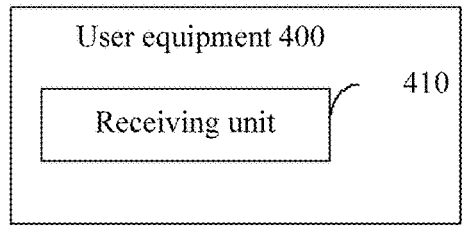
FIG. 3
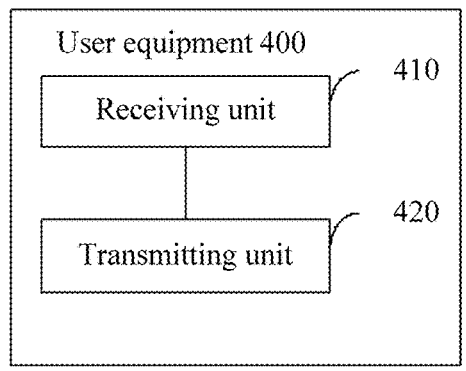
FIG. 4A
FIG. 4B
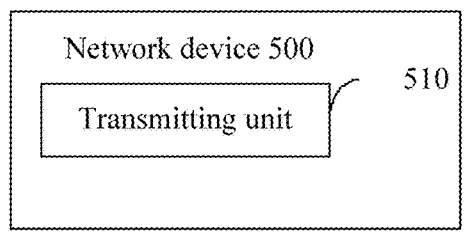
FIG. 5A
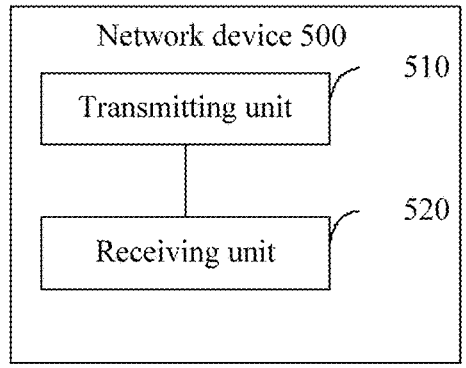
FIG. 5B

COMMUNICATION METHOD IN VEHICLE TO EVERYTHING, USER EQUIPMENT, AND NETWORK DEVICE

CROSS-REFERENCE TO RELATED APPLICATION

The present application is a continuation application of International PCT Application No. PCT/CN2019/092107, filed on Jun. 20, 2019, which claims priority to Chinese Patent Application No. 201810832687.3, filed on Jul. 26, 2018. The present application claims priority and the benefit of the above-identified applications and the above-identified applications are incorporated by reference herein in their entirety.

TECHNICAL FIELD

Implementations of the present disclosure relate to the field of communication technologies, and more particularly relate to a communication method in a vehicle to everything (V2X), user equipment (UE), and a network device.

RELATED ART

A vehicle to everything (V2X) system adopts a direct communication method from user equipment (UE) to UE, which has higher spectrum efficiency and lower transmission delay. In the V2X system, generally two types of user equipment (UE) may be considered: one is vehicle user equipment (VUE), and the other one is pedestrian user equipment (PUE). In the V2X system, UE and UE may perform relay communication through an access network device based on a Uu interface, or may also perform direct communication based on a PC5 interface.

However, in some cases, when two sets of UE perform direct communication based on the PC5 interface, the UE may support various radio access technologies (RATs) on the PC5 interface. For example, in a 5th generation (5G) system, the UE may support both an evolved universal mobile telecommunication system territorial radio access (E-UTRA) technology and a new radio (NR) technology on the PC5 interface, so that the UE cannot determine to use which RAT.

Therefore, there is an urgent need to provide a communication method in the V2X to achieve a correct communication between UE and UE on the PC5 interface.

SUMMARY

Implementations of the present disclosure provides a communication method in a vehicle to everything (V2X), user equipment (UE), and a network device, so as to achieve a correct communication between UE and UE on a PC5 interface.

According to a first aspect, a communication method in a vehicle to everything (V2X) is provided, including:
receiving, by user equipment (UE), first information transmitted by a network device, the first information being configured to instruct a radio access technology (RAT) authorized to be used by the UE on a PC5 interface.

According to a second aspect, a communication method in a vehicle to everything (V2X) is provided, including:
transmitting, by a network device, first information to user equipment (UE), the first information being configured to instruct a radio access technology (RAT) authorized to be used by the UE on a PC5 interface.

According to a third aspect, user equipment (UE) is provided, which is configured to implement the method in the first aspect or each implementation mode thereof.

Specifically, the UE includes functional modules configured to implement the method in the first aspect or each implementation mode thereof.

According to a fourth aspect, a network device is provided, which is configured to implement the method in the second aspect or each implementation mode thereof.

Specifically, the network device includes functional modules configured to implement the method in the second aspect or each implementation mode thereof.

According to a fifth aspect, a communication device is provided, including a processor and a memory. The memory is configured to store a computer program. The processor is configured to call and run the computer program stored in the memory to implement the method in any one of the first aspect and the second aspect or each implementation mode thereof.

According to a sixth aspect, a chip is provided, which is configured to realize the method in any one of the first aspect and the second aspect or each implementation mode thereof.

Specifically, the chip includes: a processor, configured to call and run a computer program from a memory to enable a device with the chip to implement the method in any one of the first aspect and the second aspect or each implementation mode thereof.

According to a seventh aspect, a computer readable storage medium is provided, which is configured to store a computer program. The computer program enables a computer to implement the method in any one of the first aspect and the second aspect or each implementation mode thereof.

According to an eighth aspect, a computer program product is provided, including a computer program command. The computer program command enables a computer to implement the method in any one of the first aspect and the second aspect or in each implementation mode thereof.

According to a ninth aspect, a computer program is provided. When being run on a computer, the computer program enables the computer to implement the method in any one of the first aspect and the second aspect or each implementation mode thereof.

Through the technical solutions, the UE receives the first information transmitted by the network device, and the first information is configured to instruct the RAT authorized to be used by the UE on the PC5 interface, so that the UE may determine to use the RAT instructed by the first information, thereby achieving the correct communication between UE and UE on the PC5 interface.

BRIEF DESCRIPTION OF DRAWINGS

FIG. 1A is a schematic diagram of architecture of a communication system provided by an implementation of the present disclosure;

FIG. 1B is a schematic diagram of architecture of a vehicle to everything (V2X) system provided by an implementation of the present disclosure;

FIG. 2A is a schematic diagram of a communication method in a V2X provided by an implementation of the present disclosure;

FIG. 3 is a schematic diagram of another communication method in a V2X provided by an implementation of the present disclosure;

FIG. 4A is a schematic block diagram of user equipment (UE) provided by an implementation of the present disclosure;

FIG. 4B is a schematic block diagram of user equipment (UE) provided by an implementation of the present disclosure;

FIG. 5A is a schematic block diagram of a network device provided by an implementation of the present disclosure;

FIG. 5B is a schematic block diagram of a network device provided by an implementation of the present disclosure;

DETAILED DESCRIPTION

Figure 2B:
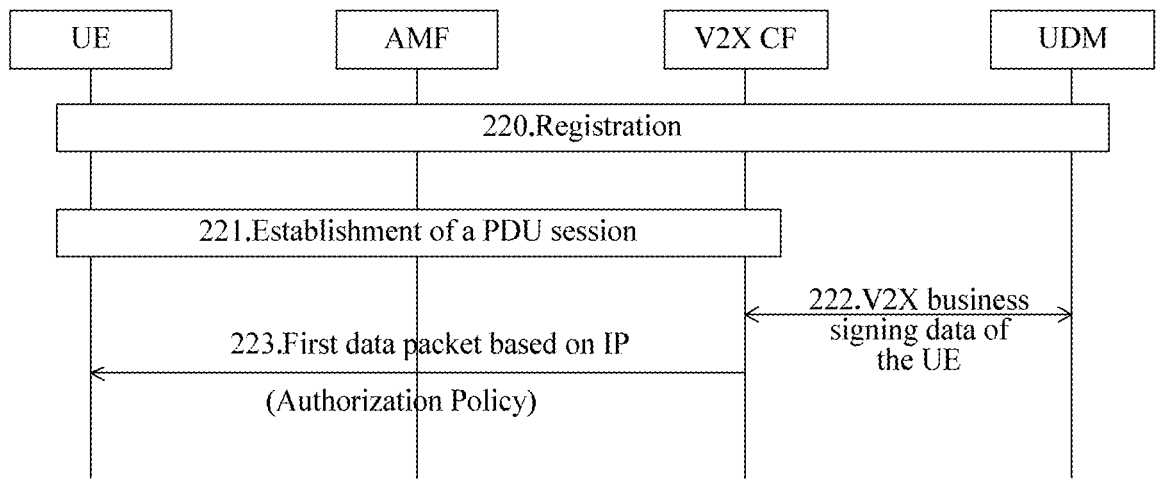
FIG. 2B is a schematic diagram of a communication method in a V2X provided by an implementation of the present disclosure.

The technical solutions in the implementations of the present disclosure will be described below with reference to the drawings in the implementations of the present disclosure. Obviously, the described implementations are part of the implementations of the present disclosure, but not all of the implementations. Based on the implementations in the present disclosure, all other implementations obtained by a person of ordinary skill in the art without creative efforts shall fall within the protection scope of the present disclosure.

The technical solutions according to the implementations of the present disclosure may be applied to a variety of communications systems, such as a Global System for Mobile communications ("GSM" for short) system, a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, an LTE Frequency Division Duplex ("FDD" for short) system, an LTE Time Division Duplex ("TDD" for short), a Universal Mobile Telecommunication System ("UMTS" for short), a Worldwide Interoperability for Microwave Access ("WiMAX" for short) communications system, a future 5G system, or the like.

Exemplarily, a communication system 100 applied in an implementation of the present disclosure is as shown in FIG. 1A. The communication system 100 may include a network device 110. The network device 110 may be a device communicating with user equipment (UE) 120 (or referred to as a communication terminal or a terminal). The network device 110 may provide communication coverage to a specific geographic region, and may communicate with user equipment located within the coverage region. Optionally, the network device 110 may be a base transceiver station (BTS) in a GSM system or a CDMA system, or a nodeB (NB) in a WCDMA system, or an evolutional node B (eNB or eNodeB) in an LTE system, or a wireless controller in a cloud radio access network (CRAN). Or, the network device may be a mobile switching center, a relay station, an access point, an on-board device, a wearable device, a concentrator, a switchboard, a network bridge, a router, a network-side device in a 5th generation (5G) network, or a network device in a public land mobile network (PLMN) that will be evolved in the future, and the like.

The communication system 100 further includes at least one set of UE 120 located within a coverage range of the network device 110. The "UE" used herein includes, but not limited to, connection via a wired line, such as connection via public switched telephone networks (PSTN), a digital subscriber line (DSL), a digital cable, and a direct cable; and/or another data connection/network; and/or via a wireless interface, for example, for a cellular network, a wireless local area network (WLAN), a digital television network such as a DVB-H network, a satellite network and an AM-FM broadcast transmitter; and/or an apparatus of another set of UE, which is configured to receive/transmit a communication signal; and/or an Internet of things (IoT) device. The UE configured to realize communication through a wireless interface may be referred to as a "wireless communication terminal", a "wireless terminal", or a "mobile terminal". Examples of the mobile terminal include, but not limited to, a satellite or cellular phone, and a personal communications system (PCS) terminal that may combine a cellular radiotelephone with data processing, facsimile, and data communication capabilities; a radiotelephone, a pager, an Internet/intranet access, a Web browser, a notepad, a calendar, and/or a PDA of a global positioning system (GPS) receiver; and a conventional laptop and/or palmtop receiver or others electronic apparatuses including radiotelephone transceivers. The UE may refer to an access terminal, UE, a user unit, a user station, a mobile station, a mobile platform, a remote station, a remote terminal, a mobile device, a user terminal, a terminal, a wireless communication device, a user agent, or a user apparatus. The access terminal may be a cell phone, a cordless telephone, a session initiation protocol (SIP) telephone, a wireless local loop (WLL) station, a personal digital assistant (PDA), a handheld device having a wireless communication function, a computation device or other processing devices connected to a radio modem, an on-board device, a wearable device, UE in a 5G network, or UE in the PLMN that will be evolved in the future, and the like.

Optionally, device to device (D2D) communication may be realized among the UE 120.

Optionally, the 5G system or 5G network may also be referred to as a new radio (NR) system or NR network.

In a vehicle to everything (V2X) system, a direct communication method from UE to UE is used, which has higher spectrum efficiency and lower transmission delay. UE and UE may perform relay communication through an access network device based on a Uu interface, or may also perform direct communication based on a PC5 interface, as shown in FIG. 1B.

FIG. 1A exemplarily illustrates one network device and two sets of UE. Optionally, the communication system 100 may include a plurality of network devices, and a coverage range of each network device may include other numbers of sets of UE, which is not limited by the implementation of the present disclosure.

Optionally, the communication system 100 may also include other network entities such as a network controller and a mobile management entity, which is not limited by the implementation of the present disclosure.

It should be understood that a device having a communication function in a network/system in the implementation of the present disclosure may be referred to as a communication device. The communication system 100 shown in FIG. 1A is taken as an example. The communication device may include a network device 110 and UE 120 which have communication functions. The network device 110 and the UE 120 may be the above-mentioned specific devices, and descriptions thereof are omitted here. The communication device may also include other devices in the communication system 100, such as other network entities including the network controller, the mobile management entity, and the like, which is not limited by the implementation of the present disclosure.

It should be understood that the terms "system" and "network" herein may often be interchanged herein. The term "and/or" herein is only an association relationship that describes associated objects, and represents that there may be three relationships. For example, A and/or B may represent that: A exists alone, A and B exist simultaneously, and B exists alone. In addition, the character "/" herein generally indicates that front and back associated objects are in an "or" relationship.

The V2X system has two types of air interfaces: one is a Uu interface, which needs an access network device, such as a base station, to serve as a control center, and communication between UE and UE, such as a vehicle and an infrastructure, and other vehicles, is realized by transferring data in the access network device; the other one is a PC5 interface which may realize direct data transmission between UE and UE, such as between vehicles.

The UE may support various radio access technologies (RATs) on the PC5 interface. For example, in a 5G system, the UE may support both an evolved universal mobile telecommunication system territorial radio access (E-UTRA) technology and a new radio (NR) technology on the PC5 interface, so that the UE may not determine to use which RAT. Then, the UE may only know the RAT supported by itself on the PC5 interface, and may not know the RAT authorized by a network to be used by the UE. If the UE is authorized to use the RAT on the PC5 interface, but since the UE does not know the authorization, RAT resources requested by the UE may be other RAT resources supported by the UE, and are refused by the network device, thus causing that the UE fails in correct communication on the PC5 interface to implement a V2X business.

FIG. 2A is a schematic flow diagram of a communication method 200 in a vehicle to everything (V2X) provided by an implementation of the present disclosure. As shown in FIG. 2A, At 210, user equipment (UE) receives first information transmitted by a network device, the first information being configured to instruct a radio access technology authorized to be used by the UE on a PC5 interface.

The network device involved in the present disclosure may be a mobility management device, such as an access and mobility management function (AMF) in a 5G core network, i.e., a next generation core network (NGCN), or a mobility management entity (MME) in a 4G core network, i.e., an evolved packet core network (EPC), or may also be a policy control device, such as a vehicle to everything control function (V2X CF) or a policy control function (PCF), and the like, which is not specifically limited by the present implementation.

In a network structure, it is supported that the V2X CF is an independent network element or that the function of the V2X CF is carried in the PCF, which is not specifically limited by the present implementation.

Optionally, in one possible implementation mode of the present implementation, the radio access technology (RAT) authorized to be used by the UE on the PC5 interface may be a new radio (NR) technology, or may also be an evolved universal mobile telecommunication system territorial radio access (E-UTRA) technology, or may also be both the NR technology and the E-UTRA technology, which is not specifically limited by the present implementation.

In this implementation mode, the UE may be registered in a 5G system, or may be registered in a 4G system, which is not specifically limited by the present implementation.

The so-called registration of the UE in the 5G system may be that the UE is accessed into the 5G core network, i.e., the NGCN, through the NR or the E-UTRAN, which is not specifically limited by the present implementation.

The so-called registration of the UE in the 4G system may be that the UE is accessed into the 4G core network, i.e., the EPC, through the NR or the E-UTRAN, which is not specifically limited by the present implementation.

Optionally, in one possible implementation mode of the present implementation, the first information may include an instruction parameter configured to directly instruct the RAT, i.e., a PC5 RAT, such as the E-UTRA, the NR or the E-UTRA and the NR, which is authorized to be used by the UE on the PC5 interface, which is not specifically limited by the present implementation. Or, the first information may include a plurality of instruction parameters configured to respectively instruct the RAT, i.e., a PC5 RAT, such as authorized PC5 RAT with E-UTRAN and authorized PC5 RAT with NR, which is authorized to be used by the UE on the PC5 interface when the UE is registered to a core network through a certain RAT, such as the E-UTRAN or the NR, which is not specifically limited by the present implementation.

The authorized PC5 RAT with E-UTRAN is configured to instruct the RAT authorized to be used by the UE on the PC5 interface, i.e., the PC5 RAT, such as the E-UTRA, the NR or the E-UTRA and the NR, when the UE is registered to the core network through the E-UTRAN.

The authorized PC5 RAT with NR is configured to instruct the RAT authorized to be used by the UE on the PC5 interface, i.e., the PC5 RAT, such as the E-UTRA, the NR or the E-UTRA and the NR, when the UE is registered to the core network through the NR.

Optionally, in one possible implementation mode of the present implementation, the first information may be specifically configured to instruct at least one public land mobile network (PLMN) authorized to the UE and an RAT authorized to be used on the PC5 interface in each of the at least one PLMN.

In this implementation mode, the first information may further include a list parameter configured to directly instruct the at least one PLMN, i.e., a PLMN list, which is authorized to the UE, or may include a plurality of list parameters configured to respectively instruct the PLMN lists allowed to use the V2X business of the UE, such as the authorized PLMN with NR and the authorized PLMN with E-UTRAN, when the UE is registered to the core network through a certain radio access network (RAN), such as the E-UTRAN or the NR, which is not specifically limited by the present implementation.

The authorized PLMN with NR is configured to instruct the PLMN list allowed to use the V2X business when the UE is registered to the core network through the NR.

The authorized PLMN with E-UTRAN is configured to instruct that the PLMN list allowed to use the V2X business when the UE is registered to the core network through the E-UTRAN.

At this time, the RAT authorized to be used by the UE on the PC5 interface, which is instructed in the first information, may be the RAT authorized to be used by the UE on the PC5 interface in each of the at least one PLMN.

Optionally, in one possible implementation mode of the present implementation, the first information may be specifically independently transmitted by the network device, or may be packaged into other information and transmitted together by the network device. For example, the first information may be carried in an authorization policy, which is not specifically limited by the present implementation.

Optionally, in one possible implementation mode of the present implementation, the UE may further receive third information transmitted by the network device. The third information is configured to instruct an authorized RAT corresponding to the V2X business used on the PC5 interface.

In this implementation mode, there is no fixed order to implement the two steps that the UE receives the first information transmitted by the network device, and the UE receives the third information transmitted by the network device. The UE may receive the first information transmitted by the network device at first, and then receive the third information transmitted by the network device, or the UE may receive the third information transmitted by the network device at first, and then receive the first information transmitted by the network device, or the UE may simultaneously receive the first information and the third information which are transmitted by the network device, which is not specifically limited by the present implementation.

In one specific implementation process, the third information may be specifically independently transmitted by the network device, or may be packaged into other information and transmitted together by the network device. For example, the third information may be carried in an authorization policy, which is not specifically limited by the present implementation.

Optionally, in one possible implementation mode of the present implementation, at 210, the UE may specifically receive the first information transmitted by the network device through a first data packet.

In one specific implementation process, the first data packet may be a data packet based on various communication protocols, such as an Internet Protocol (IP), an Ethernet Protocol or an Unstructure, which is not specifically limited by the present implementation.

For example, the first data packet being a data packet based on the IP is taken as an example, as shown in FIG. 2B.

At 220, the UE is registered in the 5GS, and the RAT supported by the UE on the PC5 interface is reported.

At 221, if no IP connection exists between the UE and the V2X CF, the UE establishes an IP connection between the UE and the V2X CF through a packet data unit (PDU) session establishing flow; and if an IP connection exists between the UE and the V2X CF, the UE does not need to implement the step 221, but directly implements step 222.

At 222, the V2X CF acquires V2X business signing data of the UE from unified data management (UDM), including:

whether the UE is allowed to use the V2X business on the PC5 interface and the Uu interface, and the like.

At 223, the V2X CF transmits an authorization policy to the UE through the first data packet based on the IP according to the V2X business signing data of the UE and a local configuration.

The authorization policy may include first information. The first information may include, but not limited to, an authorized PC5 RAT with E-UTRAN, an authorized PC5 RAT with NR, an authorized PLMN with NR, and an authorized PLMN with E-UTRAN, which is not specifically limited by the present implementation.

The authorized PC5 RAT with E-UTRAN is configured to instruct the RAT authorized to be used by the UE on the PC5 interface, i.e., the PC5 RAT, such as the E-UTRA, the NR or the E-UTRA and the NR, when the UE is registered to the core network through the E-UTRAN.

The authorized PC5 RAT with NR is configured to instruct the RAT authorized to be used by the UE on the PC5 interface, i.e., the PC5 RAT, such as the E-UTRA, the NR or the E-UTRA and the NR, when the UE is registered to the core network through the NR.

The authorized PLMN with NR is configured to instruct the PLMN list allowed to use the V2X business when the UE is registered to the core network through the NR.

The authorized PLMN with E-UTRAN is configured to instruct the PLMN list allowed to use the V2X business when the UE is registered to the core network through the E-UTRAN.

Meanwhile, the V2X CF may further transmit third information to the UE in the authorization policy. The third information is configured to instruct an authorized RAT corresponding to the V2X business used on the PC5 interface, i.e., the PC5 RAT corresponding to the V2X business. In this way, the UE may select a proper PC5 RAT when using a certain V2X business.

After receiving the authorization policy, the UE knows a selectable PLMN identity (ID), the RAT authorized to be used by the UE on the PC5 interface under a certain PLMN, and the authorized RAT corresponding to the V2X business used on the PC5 interface when the UE is registered to the core network through the NR or the E-UTRAN.

Optionally, in one possible implementation mode of the present implementation, at 210, the UE may specifically receive the first information transmitted by the network device through a first signaling.

Figure 2C:
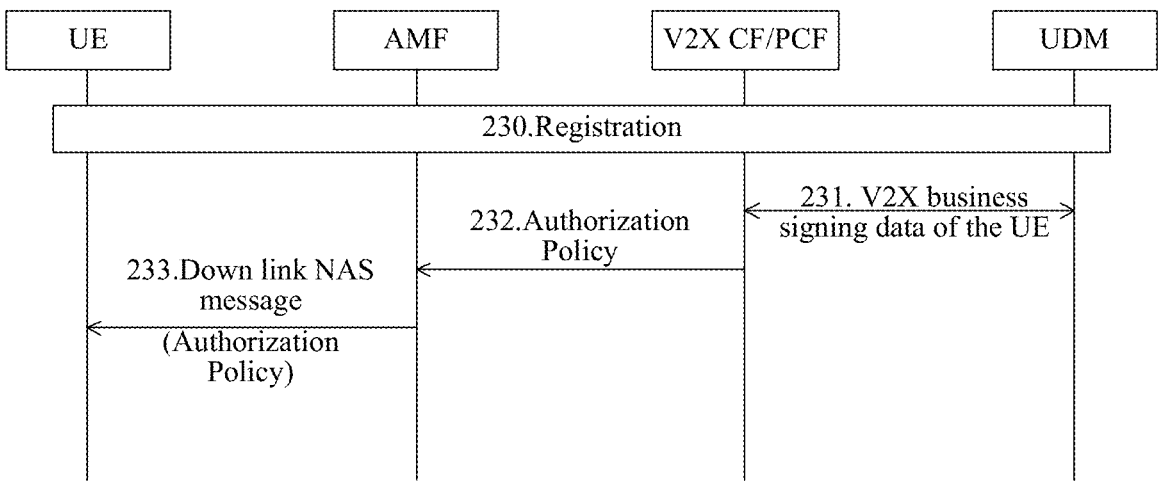
FIG. 2C is a schematic diagram of a communication method in a V2X provided by an implementation of the present disclosure.

For example, the first signaling being an NAS signaling is taken as an example, as shown in FIG. 2C.

At 230, the UE is registered in the 5GS, and the RAT supported by the UE on the PC5 interface is reported.

During registration, the AMF informs the V2X CF or the PCF that the UE has been registered to the core network, and of the V2X capacity supported by the UE and the RAT supported by the UE on the PC5 interface.

At 231, the V2X CF or the PCF acquires V2X business signing data of the UE from the UDM, including:

whether the UE is allowed to use the V2X business on the PC5 interface and the Uu interface, and the like.

At 232, the V2X CF or the PCF transmits an authorization policy to the AMF according to the V2X business signing data of the UE and a local configuration.

The authorization policy may include first information. The first information may include, but not limited to, an authorized PC5 RAT with E-UTRAN, an authorized PC5 RAT with NR, an authorized PLMN with NR, and an authorized PLMN with E-UTRAN, which is not specifically limited by the present implementation.

The authorized PC5 RAT with E-UTRAN is configured to instruct the RAT authorized to be used by the UE on the PC5 interface, i.e., the PC5 RAT, such as the E-UTRA, the NR or the E-UTRA and the NR, when the UE is registered to the core network through the E-UTRAN.

The authorized PC5 RAT with NR is configured to instruct the RAT authorized to be used by the UE on the PC5 interface, i.e., the PC5 RAT, such as the E-UTRA, the NR or the E-UTRA and the NR, when the UE is registered to the core network through the NR.

The authorized PLMN with NR is configured to instruct the PLMN list allowed to use the V2X business when the UE is registered to the core network through the NR.

The authorized PLMN with E-UTRAN is configured to instruct the PLMN list allowed to use the V2X business when the UE is registered to the core network through the E-UTRAN.

At 233, the AMF transmits the authorization policy to the UE by carrying the authorization policy in a down link non-access stratum (NAS) message (DL NAS Message).

Meanwhile, the V2X CF or the PCF may further transmit third information to the UE in the authorization policy. The third information is configured to instruct an authorized RAT corresponding to the V2X business used on the PC5 interface, i.e., the PC5 RAT corresponding to the V2X business. In this way, the UE may select a proper PC5 RAT when using a certain V2X business.

After receiving the authorization policy, the UE knows a selectable PLMN identity (ID), the RAT authorized to be used by the UE on the PC5 interface under a certain PLMN, and the authorized RAT corresponding to the V2X business used on the PC5 interface when the UE is registered to the core network through the NR or the E-UTRAN.

In one specific implementation process, the first signaling may include, but not limited to, a registration accept signaling, which is not specifically limited by the present implementation.

Figure 2D:
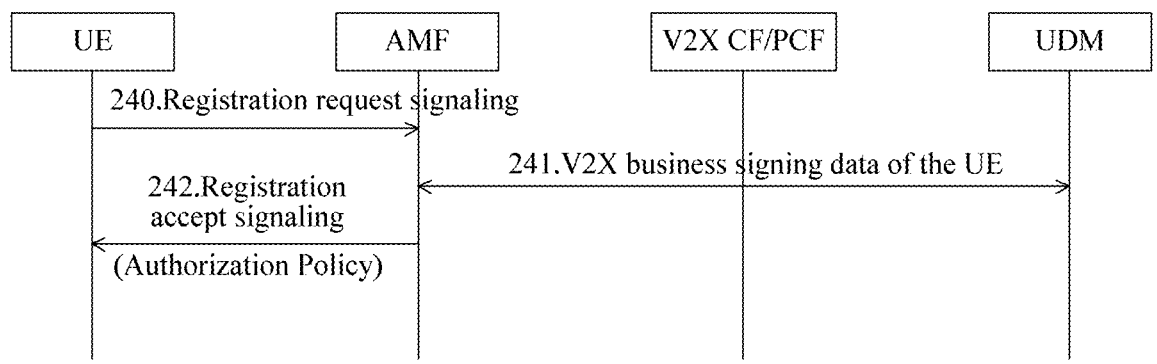
FIG. 2D is a schematic diagram of a communication method in a V2X provided by an implementation of the present disclosure.

For example, the first signaling being the registration accept signaling is taken as an example, as shown in FIG. 2D.

At 240, the UE is registered in the 5GS, and transmits a registration request signaling to the AMF. The registration request may include, but not limited to, an RAT supported by the UE on the PC5 interface.

At 241, the AMF acquires V2X business signing data of the UE from the UDM, including:

whether the UE is allowed to use the V2X business on the PC5 interface and the Uu interface, and the like.

At 242, the AMF transmits an authorization policy to the UE through the registration accept signaling according to the V2X business signing data of the UE and a local configuration.

The authorization policy may include first information. The first information may include, but not limited to, an authorized PC5 RAT with E-UTRAN, an authorized PC5 RAT with NR, an authorized PLMN with NR, and an authorized PLMN with E-UTRAN, which is not specifically limited by the present implementation.

The authorized PC5 RAT with E-UTRAN is configured to instruct the RAT authorized to be used by the UE on the PC5 interface, i.e., the PC5 RAT, such as the E-UTRA, the NR or the E-UTRA and the NR, when the UE is registered to the core network through the E-UTRAN.

The authorized PC5 RAT with NR is configured to instruct the RAT authorized to be used by the UE on the PC5 interface, i.e., the PC5 RAT, such as the E-UTRA, the NR or the E-UTRA and the NR, when the UE is registered to the core network through the NR.

The authorized PLMN with NR is configured to instruct the PLMN list allowed to use the V2X business when the UE is registered to the core network through the NR.

The authorized PLMN with E-UTRAN is configured to instruct the PLMN list allowed to use the V2X business when the UE is registered to the core network through the E-UTRAN.

Meanwhile, the V2X CF may further transmit third information to the UE in the authorization policy. The third information is configured to instruct an authorized RAT corresponding to the V2X business used on the PC5 interface, i.e., the PC5 RAT corresponding to the V2X business. In this way, the UE may select a proper PC5 RAT when using a certain V2X business.

After receiving the authorization policy, the UE knows a selectable PLMN identity (ID), the RAT authorized to be used by the UE on the PC5 interface under a certain PLMN, and the authorized RAT corresponding to the V2X business used on the PC5 interface when the UE is registered to the core network through the NR or the E-UTRAN.

Optionally, in one possible implementation mode of the present implementation, before the step 210, the UE may further transmit second information to the network device. The second information is configured to instruct an RAT requested to be used by the UE on the PC5 interface.

In one specific implementation process, in this implementation mode, before the UE transmits the second information to the network device, the second information may be further determined according to the RAT supported by the UE on the PC5 interface and the RAT corresponding to the V2X business used by the UE on the PC5 interface.

For example, the RAT requested to be used by the UE on the PC5 interface, i.e., the second information, is determined according to the RAT supported by the UE on the PC5 interface, the RAT corresponding to the V2X business used by the UE on the PC5 interface, the V2X business signing data of the UE, and other information.

In another specific implementation process, the UE transmits the second information to the network device through a second data packet. Specifically, the second data packet may be a data packet based on various communication protocols, such as an IP, an Ethernet Protocol or an Unstructure, which is not specifically limited by the present implementation.

For example, the second data packet being a data packet based on the IP is taken as an example, as shown in FIG. 2B. Based on an implementation process corresponding to FIG. 2B, a difference is that between the step 222 and the step 223, the UE may further determine the RAT requested to be used by the UE on the PC5 interface, i.e., the second information, according to the RAT supported by the UE on the PC5 interface, the RAT corresponding to the V2X business used on the PC5 interface, the V2X business signing data of the UE, and other information.

In the second information, the RAT requested to be used by the UE on the PC5 interface, which is determined by the UE, may aim at one V2X business, or may aim at a plurality of V2X businesses, which is not specifically limited by the present implementation.

After the second information is determined, the UE may transmit a PC5 RAT authorization request to the V2X CF through the second data packet based on the IP.

The PC5 RAT authorization request may include the second information. The second information may include, but not limited to, a V2X business ID, and an RAT corresponding to the V2X business used on the PC5 interface, which is not specifically limited by the present implementation.

Then, correspondingly, at 223, the V2X CF may determine whether to authorize the RAT requested by the UE and used to use the V2X business on the PC5 interface according to the V2X business signing data of the UE and the local configuration, then package an authorization result into the authorization policy, and transmit the authorization policy to the UE through the first data packet based on the IP.

In another specific implementation process, the UE transmits the second information to the UE through a second signaling.

For example, the second signaling being an NAS signaling is taken as an example, as shown in FIG. 2C. Based on an implementation process corresponding to FIG. 2C, a difference is that between the step 231 and the step 232, the UE may further determine the RAT requested to be used by the UE on the PC5 interface, i.e., the second information, according to the RAT supported by the UE on the PC5 interface, the RAT corresponding to the V2X business used on the PC5 interface, the V2X business signing data of the UE, and other information.

In the second information, the RAT requested to be used by the UE on the PC5 interface, which is determined by the UE, may aim at one V2X business, or may aim at a plurality of V2X businesses, which is not specifically limited by the present implementation.

After the second information is determined, the UE may transmit a PC5 RAT authorization request to the V2X CF or the PCF through an up link non-access stratum (NAS) message (UL NAS Message).

The PC5 RAT authorization request may include the second information. The second information may include, but not limited to, a V2X business ID, and an RAT corresponding to the V2X business used on the PC5 interface, which is not specifically limited by the present implementation.

Then, correspondingly, at 223, the V2X CF or the PCF may determine whether to authorize the RAT which is requested by the UE and used to use the V2X business on the PC5 interface according to the V2X business signing data of the UE and the local configuration, then package an authorization result into the authorization policy, and transmit the authorization policy to the UE through the DL NAS message.

In this implementation process, the second signaling may include, but not limited to, a registration request signaling, which is not specifically limited by the present implementation.

For example, the second signaling being the registration request signaling is taken as an example, as shown in FIG. 2D. Based on the implementation process corresponding to FIG. 2D, a difference is that before the step 240, the UE may further determine the RAT requested to be used by the UE on the PC5 interface, i.e., the second information, according to the RAT supported by the UE on the PC5 interface, the RAT corresponding to the V2X business used on the PC5 interface, the V2X business signing data of the UE, and other information.

In the second information, the RAT requested to be used by the UE on the PC5 interface, which is determined by the UE, may aim at one V2X business, or may aim at a plurality of V2X businesses, which is not specifically limited by the present implementation.

After the second information is determined, at 240, the UE may specifically package a PC5 RAT authorization request into the registration request signaling, and transmit the signaling to the AMF.

The PC5 RAT authorization request may include the second information. The second information may include, but not limited to, a V2X business ID, and an RAT corresponding to the V2X business used on the PC5 interface, which is not specifically limited by the present implementation.

Then, correspondingly, at 242, the AMF may determine whether to authorize the RAT which is requested by the UE and used to use the V2X business on the PC5 interface according to the V2X business signing data of the UE and the local configuration, then package an authorization result into the authorization policy, and transmit the authorization policy to the UE through a registration accept signaling.

In the present implementation, the UE receives the first information transmitted by the network device, and the first information is configured to instruct the RAT authorized to be used by the UE on the PC5 interface, so that the UE may determine to use the RAT instructed by the first information, thereby achieving a correct communication between UE and UE on the PC5 interface.

FIG. 3 is a schematic flow diagram of another communication method 300 in a vehicle to everything (V2X) provided by an implementation of the present disclosure. As shown in FIG. 3, 310, a network device transmits first information to user equipment (UE), the first information being configured to instruct a radio access technology (RAT) authorized to be used by the UE on a PC5 interface.

The network device involved in the present disclosure may be a mobility management device, such as an access and mobility management function (AMF) in a 5G core network, i.e., a next generation core network (NGCN), or a mobility management entity (MME) in a 4G core network, i.e., an evolved packet core network (EPC), or may also be a policy control device, such as a vehicle to everything control function (V2X CF) or a policy control function (PCF), and the like, which is not specifically limited by the present implementation.

In a network structure, it is supported that the V2X CF is an independent network element or that the function of the V2X CF is carried in the PCF, which is not specifically limited by the present implementation.

Optionally, in one possible implementation mode of the present implementation, the RAT authorized to be used by the UE on the PC5 interface may be a new radio (NR) technology, or may also be an evolved universal mobile telecommunication system territorial radio access (E-UTRA) technology, or may also be both the NR technology and the E-UTRA technology, which is not specifically limited by the present implementation.

In this implementation mode, the UE may be registered in a 5G system, or may be registered in a 4G system, which is not specifically limited by the present implementation.

The so-called registration of the UE in the 5G system may be that the UE is accessed into the 5G core network, i.e., the NGCN, through the NR or the E-UTRAN, which is not specifically limited by the present implementation.

The so-called registration of the UE in the 4G system may be that the UE is accessed into the 4G core network, i.e., the EPC, through the NR or the E-UTRAN, which is not specifically limited by the present implementation.

Optionally, in one possible implementation mode of the present implementation, the first information may include an instruction parameter configured to directly instruct the RAT, i.e., a PC5 RAT, such as the E-UTRA, the NR or the E-UTRA and the NR, which is authorized to be used by the UE on the PC5 interface, which is not specifically limited by the present implementation. Or, the first information may include a plurality of instruction parameters configured to respectively instruct the RAT, i.e., a PC5 RAT, such as authorized PC5 RAT with E-UTRAN and authorized PC5 RAT with NR, which is authorized to be used by the UE on the PC5 interface when the UE is registered to a core network through a certain RAT, such as the E-UTRAN or the NR, which is not specifically limited by the present implementation.

The authorized PC5 RAT with E-UTRAN is configured to instruct the RAT authorized to be used by the UE on the PC5 interface, i.e., the PC5 RAT, such as the E-UTRA, the NR or the E-UTRA and the NR, when the UE is registered to the core network through the E-UTRAN.

The authorized PC5 RAT with NR is configured to instruct the RAT authorized to be used by the UE on the PC5 interface, i.e., the PC5 RAT, such as the E-UTRA, the NR or the E-UTRA and the NR, when the UE is registered to the core network through the NR.

Optionally, in one possible implementation mode of the present implementation, the first information may be specifically configured to instruct at least one public land mobile network (PLMN) authorized to the UE and the RAT authorized to be used on the PC5 interface in each of the at least one PLMN.

In this implementation mode, the first information may further include a list parameter configured to directly instruct the at least one PLMN, i.e., a PLMN list, which is authorized by the UE, or may include a plurality of list parameters configured to respectively instruct the PLMN list allowed to use the V2X business of the UE, such as the authorized PLMN with NR and the authorized PLMN with E-UTRAN, when the UE is registered to the core network through a certain radio access network (RAN), such as the E-UTRAN or the NR, which is not specifically limited by the present implementation.

The authorized PLMN with NR is configured to instruct the PLMN list allowed to use the V2X business when the UE is registered to the core network through the NR.

The authorized PLMN with E-UTRAN is configured to instruct the PLMN list allowed to use the V2X business when the UE is registered to the core network through the E-UTRAN.

At this time, the RAT authorized to be used by the UE on the PC5 interface, which is instructed in the first information, may be an RAT authorized to be used by the UE on the PC5 interface in each of the at least one PLMN.

Optionally, in one possible implementation mode of the present implementation, the first information may be specifically independently transmitted by the network device, or may be packaged into other information and transmitted together by the network device. For example, the first information may be carried in an authorization policy, which is not specifically limited by the present implementation.

Optionally, in one possible implementation mode of the present implementation, the network device may further transmit third information to the UE. The third information is configured to instruct an authorized RAT corresponding to the V2X business used on the PC5 interface.

In this implementation mode, there is no fixed order to implement the two steps that the network device transmits the first information to the UE, and the network device transmits the third information to the UE. The network device may transmit the first information to the UE at first, and then transmit the third information to the UE, or the network device may transmit the third information to the UE at first, and then transmit the first information to the UE, or the network device may simultaneously transmit the first information and the third information to the UE, which is not specifically limited by the present implementation.

In one specific implementation process, the third information may be specifically independently transmitted by the network device, or may be packaged into other information and transmitted together by the network device. For example, the third information may be carried in an authorization policy, which is not specifically limited by the present implementation.

Optionally, in one possible implementation mode of the present implementation, at 310, the network device may specifically transmit the first information to the UE through a first data packet.

In one specific implementation process, the first data packet may be a data packet based on various communication protocols, such as an Internet Protocol (IP), an Ethernet Protocol or an Unstructure, which is not specifically limited by the present implementation.

For example, the first data packet being a data packet based on the IP is taken as an example, as shown in FIG. 2B. Details may refer to the related content in the foregoing implementation, and descriptions thereof are omitted herein.

Optionally, in one possible implementation mode of the present implementation, at 310, the network device may specifically transmit the first information to the UE through a first signaling.

For example, the first signaling being an NAS signaling is taken as an example, as shown in FIG. 2C. Details may refer to the related content in the foregoing implementation, and descriptions thereof are omitted herein.

In one specific implementation process, the first signaling may include, but not limited to, a registration accept signaling, which is not specifically limited by the present implementation.

For example, the first signaling being the registration accept signaling is taken as an example, as shown in FIG. 2D. Details may refer to the related content in the foregoing implementation, and descriptions thereof are omitted herein.

Optionally, in one possible implementation mode of the present implementation, before the step 310, the network device may further receive second information transmitted by the UE. The second information is configured to instruct an RAT requested to be used by the UE on the PC5 interface.

The second information is determined by the UE according to an RAT supported by the UE on the PC5 interface and an RAT corresponding to the V2X business used by the UE on the PC5 interface.

For example, the RAT requested to be used by the UE on the PC5 interface, i.e., the second information, is determined according to the RAT supported by the UE on the PC5 interface, the RAT corresponding to the V2X business used by the UE on the PC5 interface, the V2X business signing data of the UE, and other information.

In one specific implementation process, in this implementation mode, the network device may specifically receive the second information transmitted by the UE through a second data packet. Specifically, the second data packet may be a data packet based on various communication protocols, such as an Internet Protocol (IP), an Ethernet Protocol or an Unstructure, which is not specifically limited by the present implementation.

For example, the second data packet being a data packet based on the IP is taken as an example, as shown in FIG. 2B. Details may refer to the related content in the foregoing implementation, and descriptions thereof are omitted herein.

In another specific implementation process, the network device may specifically receive the second information transmitted by the UE through a second signaling.

For example, the second signaling being an NAS signaling is taken as an example, as shown in FIG. 2C. Details may refer to the related content in the foregoing implementation, and descriptions thereof are omitted herein.

In this implementation process, the second signaling may include, but not limited to, a registration request signaling, which is not specifically limited by the present implementation.

For example, the second signaling being the registration request signaling is taken as an example, as shown in FIG. 2D. Details may refer to the related content in the foregoing implementation, and descriptions thereof are omitted herein.

In the present implementation, the network device transmits the first information to the UE, and the first information is configured to instruct the RAT authorized to be used by the UE on the PC5 interface, so that the UE may determine to use the RAT instructed by the first information, thereby achieving a correct communication between UE and UE on the PC5 interface.

FIG. 4A is a schematic block diagram of user equipment (UE) 400 provided by an implementation of the present disclosure, as shown in FIG. 4A. The present implementation provides user equipment (UE) 400, which is configured to implement the method in the implementation corresponding to FIG. 2A.

Specifically, the UE 400 includes functional modules configured to implement the method in the implementation corresponding to FIG. 2A. The UE 400 may include a receiving unit 410, which is configured to receive first information transmitted by a network device, and the first information is configured to instruct a radio access technology (RAT) authorized to be used by the UE on a PC5 interface.

The network device involved in the present disclosure may be a mobility management device, such as an access and mobility management function (AMF) in a 5G core network, i.e., a next generation core network (NGCN), or a mobility management entity (MME) in a 4G core network, i.e., an evolved packet core network (EPC), or may also be a policy control device, such as a vehicle to everything control function (V2X CF) or a policy control function (PCF), and the like, which is not specifically limited by the present implementation.

In a network structure, it is supported that the V2X CF is an independent network element or that the function of the V2X CF is carried in the PCF, which is not specifically limited by the present implementation.

Optionally, in one possible implementation mode of the present implementation, the RAT may include, but not limited to, a new radio (NR) technology and/or an evolved universal mobile telecommunication system territorial radio access (E-UTRA) technology, which is not specifically limited by the present implementation.

Optionally, in one possible implementation mode of the present implementation, the receiving unit 410 is specifically configured to receive the first information transmitted by the network device through a first data packet, or receive the first information transmitted by the network device through a first signaling.

In one specific implementation process, the first signaling may include, but not limited to, a registration accept signaling, which is not specifically limited by the present implementation.

Optionally, in one possible implementation mode of the present implementation, the first information may be specifically configured to instruct at least one public land mobile network (PLMN) authorized to the UE and the RAT authorized to be used by the UE on the PC5 interface in each of the at least one PLMN.

Optionally, in one possible implementation mode of the present implementation, as shown in FIG. 4B, the UE provided by the present implementation may further include a transmitting unit 420, which is configured to transmit second information to the network device. The second information is configured to instruct an RAT requested to be used by the UE on the PC5 interface.

In one specific implementation process, the transmitting unit 420 may be specifically configured to transmit the second information to the network device through a second data packet, or transmit the second information to the network device through a second signaling. In another specific implementation process, the transmitting unit 420 may be further configured to determine the second information according to the RAT supported by the UE on the PC5 interface and the RAT corresponding to the V2X business used by the UE on the PC5 interface.

In another specific implementation process, the second signaling may include, but not limited to, a registration request signaling, which is not specifically limited by the present implementation.

Optionally, in one possible implementation mode of the present implementation, the receiving unit 410 may be further configured to receive third information transmitted by the network device. The third information is configured to instruct an authorized RAT corresponding to the V2X business used on the PC5 interface.

In the present implementation, the receiving unit receives the first information transmitted by the network device, and the first information is configured to instruct the RAT authorized to be used by the UE on the PC5 interface, so that the UE may determine to use the RAT instructed by the first information, thereby achieving a correct communication between UE and UE on the PC5 interface.

FIG. 5A is a schematic block diagram of a network device 500 provided by an implementation of the present disclosure, as shown in FIG. 5A. The present implementation provides a network device, which is configured to implement the method in the implementation corresponding to FIG. 3.

Specifically, the network device 500 includes functional modules configured to implement the method in the implementation corresponding to FIG. 3. The network device 500 may include a transmitting unit 510, which is configured to transmit first information to user equipment (UE), and the first information is configured to instruct a radio access technology authorized to be used by the UE on a PC5 interface.

The network device involved in the present disclosure may be a mobility management device, such as an access and mobility management function (AMF) in a 5G core network, i.e., a next generation core network (NGCN), or a mobility management entity (MME) in a 4G core network, i.e., an evolved packet core network (EPC), or may also be a policy control device, such as a vehicle to everything control function (V2X CF) or a policy control function (PCF), and the like, which is not specifically limited by the present implementation.

In a network structure, it is supported that the V2X CF is an independent network element or that the function of the V2X CF is carried in the PCF, which is not specifically limited by the present implementation.

Optionally, in one possible implementation mode of the present implementation, the RAT may include, but not limited to, a new radio (NR) technology and/or an evolved universal mobile telecommunication system territorial radio access (E-UTRA) technology, which is not specifically limited by the present implementation.

Optionally, in one possible implementation mode of the present implementation, the transmitting unit 510 may be specifically configured to transmit the first information to the UE through a first data packet, or transmit the first information to the UE through a first signaling.

In one specific implementation process, the first signaling may include, but not limited to, a registration accept signaling, which is not specifically limited by the present implementation.

Optionally, in one possible implementation mode of the present implementation, the first information may be specifically configured to instruct at least one public land mobile network (PLMN) authorized to the UE and the RAT authorized to be used by the UE on the PC5 interface in each of the at least one PLMN.

Optionally, in one possible implementation mode of the present implementation, as shown in FIG. 5B, the network device provided by the present implementation may further include a receiving unit 520, which is configured to receive second information transmitted by the UE. The second information is configured to instruct an RAT requested to be used by the UE on the PC5 interface.

In one specific implementation process, the receiving unit 520 is specifically configured to receive the second information transmitted by the UE through a second data packet, or receive the second information transmitted by the UE through a second signaling.

The second information is determined by the UE according to an RAT supported by the UE on the PC5 interface and an RAT corresponding to the V2X business used by the UE on the PC5 interface.

For example, the RAT requested to be used by the UE on the PC5 interface, i.e., the second information, is determined according to the RAT supported by the UE on the PC5 interface, the RAT corresponding to the V2X business used by the UE on the PC5 interface, the V2X business signing data of the UE, and other information.

In another specific implementation process, the second signaling may include, but not limited to, a registration request signaling, which is not specifically limited by the present implementation.

Optionally, in one possible implementation mode of the present implementation, a transmitting unit 510 may be further configured to transmit third information to the UE. The third information is configured to instruct an authorized RAT corresponding to the V2X business used on the PC5 interface.

In the present implementation, the transmitting unit transmits the first information to the UE, and the first information is configured to instruct the RAT authorized to be used by the UE on the PC5 interface, so that the UE may determine to use the RAT instructed by the first information, thereby achieving a correct communication between UE and UE on the PC5 interface.

Figure 6:
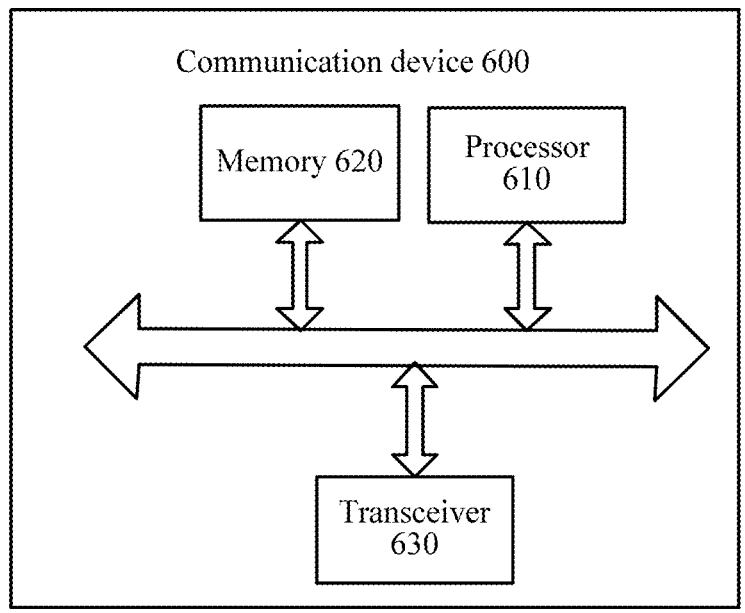
FIG. 6 is a schematic block diagram of a communication device provided by an implementation of the present disclosure.

FIG. 6 is a schematic structural diagram of a communications device 600 according to an implementation of the present disclosure. The communications device 600 shown in FIG. 6 includes a processor 610. The processor 610 may invoke a computer program from a memory and run the computer program, to implement the method in the implementations of the present disclosure.

Optionally, as shown in FIG. 6, the communications device 600 may further include a memory 620. The processor 610 may invoke the computer program from the memory 620 and run the computer program, to implement the method in the implementations of the present disclosure.

The memory 620 may be a component independent of the processor 610, or may be integrated into the processor 610.

Optionally, as shown in FIG. 6, the communications device 600 may further include a transceiver 630. The processor 610 may control the transceiver 630 to communicate with another device, and specifically, the transceiver 630 may send information or data to another device, or receive information or data sent by another device.

The transceiver 630 may include a transmitter and a receiver. The transceiver 630 may further include an antenna. There may be one or more antennas.

Optionally, the communications device 600 may be the network device in the implementations of the present disclosure, and the communications device 600 can implement corresponding procedures implemented by the network device in various methods in the implementations of the present disclosure. For brevity, details are not described herein again.

Optionally, the communications device 600 may be the terminal device in the implementations of the present disclosure, and the communications device 600 can implement corresponding procedures implemented by the terminal device in various methods in the implementations of the present disclosure. For brevity, details are not described herein again.

Figure 7:
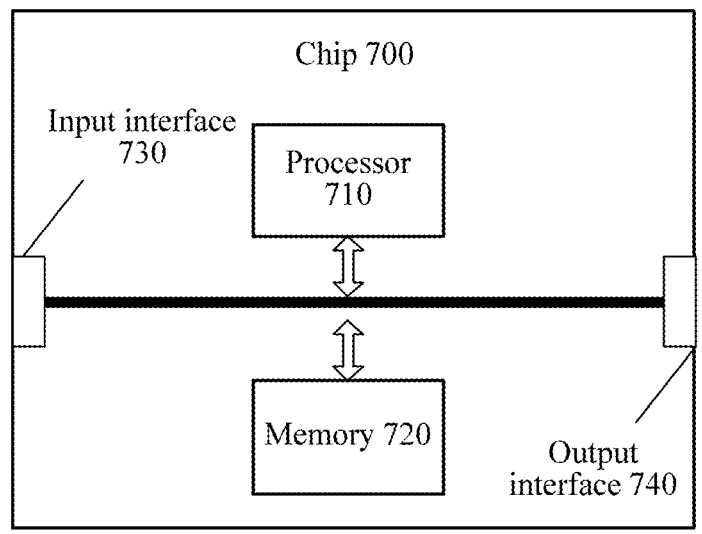
FIG. 7 is a schematic block diagram of a chip provided by an implementation of the present disclosure.

FIG. 7 is a schematic structural diagram of a chip 700 according to an implementation of the present disclosure. The chip 700 shown in FIG. 7 includes a processor 710. The processor 710 may invoke a computer program from a memory and run the computer program, to implement the method in the implementations of the present disclosure.

Optionally, as shown in FIG. 7, the chip 700 may further include a memory 720. The processor 710 may invoke the computer program from the memory 720 and run the computer program, to implement the method in the implementations of the present disclosure.

The memory 720 may be a component independent of the processor 710, or may be integrated into the processor 710.

Optionally, the chip 700 may further include an input interface 730. The processor 710 may control the input interface 730 to communicate with another device or chip, and specifically, the input interface 730 may obtain information or data sent by another device or chip.

Optionally, the chip 700 may further include an output interface 740. The processor 710 may control the output interface 740 to communicate with another device or chip, and specifically, the output interface 740 may output information or data to another device or chip Optionally, the chip may be applied to the network device in the implementations of the present disclosure, and the chip can implement corresponding procedures implemented by the network device in various methods in the implementations of the present disclosure. For brevity, details are not described herein again.

Optionally, the chip may be applied to the terminal device in the implementations of the present disclosure, and the chip can implement corresponding procedures implemented by the terminal device in various methods in the implementations of the present disclosure. For brevity, details are not described herein again.

It should be noted that, the chip mentioned in the implementations of the present disclosure may also be referred to as a system-level chip, a system chip, a chip system, a system on chip, or the like.

Figure 8:
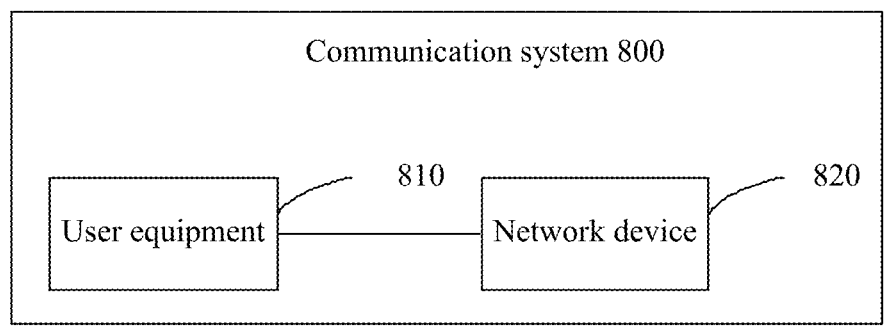
FIG. 8 is a schematic block diagram of a communication system provided by an implementation of the present disclosure.

FIG. 8 is a schematic structural diagram of a communications device 800 according to an implementation of the present disclosure. The communications device 800 shown in FIG. 8 includes a terminal device 810 and a network device 820.

The terminal device 810 can implement corresponding functions implemented by the terminal device in the foregoing method and the network device 820 can implement corresponding functions implemented by the network device in the foregoing method. For brevity, details are not described herein again.

It should be understood that, the processor of the implementations of the present disclosure may be an integrated circuit chip, has a signal processing capability, the steps of the foregoing method implementation may be implemented by using a hardware integrated logic circuit in the processor and/or implemented by using an instruction in a software form. The foregoing processor may be a general purpose processor, a digital signal processor (DSP), a field programmable gate array (FPGA), an application specific integrated circuit (ASIC) or another programmable logic device, a transistor logic device, or a discrete hardware component. Various methods, acts, and logical blocks disclosed in the implementations of the present disclosure can be implemented or executed. The foregoing general purpose processor may be a microprocessor, or may be any conventional processor, or the like. Steps of the methods disclosed with reference to the implementations of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method implementations in combination with hardware of the processor.

It should be understood that, the memory in the implementations of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). It should be noted that, the memory of the system and the method described in this implementation of the present disclosure is intended to include but is not limited to these memories and any other suitable type of memory.

It should be understood that, the memory is an example but is not intended for limitation. For example, the memory in the implementations of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in this implementation of the present disclosure is intended to include but is not limited to these memories and any other suitable type of memory.

An implementation of the present disclosure further provides a computer readable storage medium. The computer readable storage medium is configured to store a computer program.

Optionally, the computer readable storage medium may be applied to the network device in the implementations of the present disclosure, and the computer program enables a computer to execute a corresponding procedure implemented by the network device in the methods of the implementations of the present disclosure. For brevity, details are not described herein again.

Optionally, the computer readable storage medium may be applied to the terminal device in the implementations of the present disclosure, and the computer program enables the computer to execute a corresponding procedure implemented by the terminal device in the methods of the implementations of the present disclosure. For brevity, details are not described herein again.

The present disclosure further provides a computer program product. The computer program product includes a computer program instruction.

Optionally, the computer program product may be applied to the network device in the implementations of the present disclosure, and the computer program instruction enables the computer to execute a corresponding procedure implemented by the network device in the methods of the implementations of the present disclosure. For brevity, details are not described herein again.

Optionally, the computer program product may be applied to the terminal device in the implementations of the present disclosure, and the computer program instruction enables the computer to execute a corresponding procedure implemented by the terminal device in the methods of the implementations of the present disclosure. For brevity, details are not described herein again.

The present disclosure further provides a computer program.

Optionally, the computer program may be applied to the network device in the implementations of the present disclosure, and when run on a computer, the computer program instruction enables the computer to execute a corresponding procedure implemented by the network device in the methods of the implementations of the present disclosure. For brevity, details are not described herein again.

Optionally, the computer program may be applied to the terminal device in the implementations of the present disclosure, and when run on a computer, the computer program instruction enables the computer to execute a corresponding procedure implemented by the terminal device in the methods of the implementations of the present disclosure. For brevity, details are not described herein again.

A person of ordinary skill in the art may be aware that, in combination with the examples described in the implementations disclosed in this specification, units and algorithm steps may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to corresponding process in the foregoing method implementations, and details are not described herein again.

In the several implementations provided in the present disclosure, it should be understood that the disclosed system, apparatus, and method may be implemented in other manners. For example, the apparatus implementations described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the implementations.

In addition, functional units in the implementations of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the implementations of the present disclosure. The foregoing storage medium includes: any medium that can store program code, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A communication method in a vehicle to everything (V2X), comprising:
   determine, by a user equipment (UE), second information according to a RAT supported by the UE on the PC5 interface and a RAT corresponding to a V2X business used by the UE on the PC5 interface;
   transmit, by the UE, the second information to the network device through a second data packet or through a second signaling, the second information being configured to instruct a RAT requested to be used by the UE on the PC5 interface; and
   receiving, by the UE, first information transmitted by a network device, the first information being configured to instruct a radio access technology (RAT) authorized to be used by the UE on a PC5 interface,
   wherein the first information is specifically configured to instruct at least one public land mobile network (PLMN) authorized to the UE and the RAT authorized to be used by the UE on the PC5 interface in each of the at least one PLMN,
   wherein the network device comprises a policy control device,
   wherein the RAT authorized to be used by the UE on the PC5 interface comprises a new radio (NR) technology and an evolved universal mobile telecommunication system territorial radio access (E-UTRA) technology.

2. The method according to claim 1, wherein receiving, by the UE, the first information transmitted by the network device comprises:
   receiving, by the UE, the first information transmitted by the network device through a first signaling.

3. The method according to claim 1, wherein receiving, by the UE, the first information transmitted by the network device comprises:
   receiving, by the UE, the first information transmitted by the network device through a first data packet.

4. User equipment (UE), comprising: a processor and a memory, wherein the memory is configured to store a computer program, and the processor is configured to call and run the computer program stored in the memory to:
   determine second information according to a RAT supported by the UE on the PC5 interface and a RAT corresponding to a V2X business used by the UE on the PC5 interface;
   transmit the second information to the network device through a second data packet or through a second signaling, the second information being configured to instruct a RAT requested to be used by the UE on the PC5 interface; and
   receive first information transmitted by a network device, the first information being configured to instruct a radio access technology (RAT) authorized to be used by the UE on a PC5 interface,
   wherein the first information is specifically configured to instruct at least one public land mobile network (PLMN) authorized to the UE and the RAT authorized to be used by the UE on the PC5 interface in each of the at least one PLMN,
   wherein the network device comprises a policy control device,
   wherein the RAT authorized to be used by the UE on the PC5 interface comprises a new radio (NR) technology and an evolved universal mobile telecommunication system territorial radio access (E-UTRA) technology.

5. The UE according to claim 4, wherein the processor is configured to call and run the computer program stored in the memory to:
   receive the first information transmitted by the network device through a first signaling.

6. The UE according to claim 5, wherein the first signaling comprises a registration accept signaling.

7. The UE according to claim 4, wherein the second signaling comprises a registration request signaling.

8. The UE according to claim 4, wherein the processor is configured to call and run the computer program stored in the memory to:
receive the first information transmitted by the network device through a first data packet.

9. A network device, comprising: a processor and a memory, wherein the memory is configured to store a computer program, and the processor is configured to call and run the computer program stored in the memory to:
receive second information from a user equipment (UE) through a second data packet or through a second signaling, wherein the second information is determined by the UE according to a RAT supported by the UE on the PC5 interface and a RAT corresponding to a V2X business used by the UE on the PC5 interface, and wherein the second information is configured to instruct a RAT requested to be used by the UE on the PC5 interface;
transmit first information to user equipment (UE), the first information being configured to instruct a radio access technology (RAT) authorized to be used by the UE on a PC5 interface,
wherein the first information is specifically configured to instruct at least one public land mobile network (PLMN) authorized to the UE and the RAT authorized to be used by the UE on the PC5 interface in each of the at least one PLMN,
wherein the network device comprises a policy control device,
wherein the RAT authorized to be used by the UE on the PC5 comprises a new radio (NR) technology and an evolved universal mobile telecommunication system territorial radio access (E-UTRA) technology.

10. The network device according to claim 9, wherein the processor is configured to call and run the computer program stored in the memory to:
transmit the first information to the UE through a first signaling.

11. The network device according to claim 9, wherein the processor is configured to call and run the computer program stored in the memory to:
transmit the first information to the UE through a first data packet.

* * * * *